US008840480B2

(12) United States Patent
Cornell et al.

(10) Patent No.: US 8,840,480 B2
(45) Date of Patent: Sep. 23, 2014

(54) GAMING MACHINE WITH ENHANCED RF-SHIELDING ENCLOSURE

(75) Inventors: Bradley D. Cornell, LaGrange, IL (US); Jeremy K. Gill, Chicago, IL (US); Victor Mercado, Berwyn, IL (US); Zofia Ryan, Arlington Heights, IL (US); Walter E. Smolucha, Melrose Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 87 days.

(21) Appl. No.: 13/197,410

(22) Filed: Aug. 3, 2011

(65) Prior Publication Data
US 2013/0035159 A1 Feb. 7, 2013

(51) Int. Cl.
*G07F 17/32* (2006.01)
*A63F 13/70* (2014.01)
*A63F 13/00* (2014.01)

(52) U.S. Cl.
CPC ............... *A63F 13/00* (2013.01); *G07F 17/32* (2013.01)
USPC .............................. 463/46; 174/367; 174/374

(58) Field of Classification Search
USPC ......... 174/366–369, 372–374, 377, 382, 168, 174/172
See application file for complete search history.

(56) References Cited

U.S. PATENT DOCUMENTS

| 5,223,670 A | * | 6/1993 | Hogan et al. | 174/368 |
| 6,460,724 B1 | * | 10/2002 | Bradford | 220/642 |
| 6,699,128 B1 | * | 3/2004 | Beadell et al. | 463/46 |
| 7,118,483 B2 | * | 10/2006 | Beadell et al. | 463/46 |
| 7,755,906 B2 | * | 7/2010 | Sato | 361/747 |
| 2007/0197301 A1 | * | 8/2007 | Cole | 463/46 |
| 2008/0182642 A1 | * | 7/2008 | Cole | 463/20 |

* cited by examiner

*Primary Examiner* — Arthur Hall
(74) *Attorney, Agent, or Firm* — Nixon Peabody LLP

(57) ABSTRACT

A gaming terminal includes a housing defining an exterior of the gaming terminal. The gaming terminal includes one or more displays disposed along the housing. The one or more displays are adapted to display, in response to a wager, a wagering game. The gaming terminal also includes a substantially closed interior enclosure disposed within the housing. The interior enclosure includes walls formed from electrically conductive material. The interior enclosure can be substantially closed. The gaming terminal further includes one or more signal-emitting components disposed within the interior enclosure and emitting a level of electromagnetic signals. A transmission of electromagnetic signals from the substantially closed interior enclosure is less than the level of electromagnetic signals emitted from the one or more signal-emitting components.

15 Claims, 10 Drawing Sheets

GAMING MACHINE WITH ENHANCED RF-SHIELDING ENCLOSURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and more particularly, to a gaming apparatus that includes an enclosure that minimizes the emission of electromagnetic signals, such as radio frequency (RF) signals, from the gaming apparatus.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. The popularity of such machines may be enhanced, for example, by employing hardware, such as faster and more powerful computer processors, that allow more sophisticated gameplay and/or audiovisual features.

SUMMARY OF THE INVENTION

A gaming machine according to aspects of the present invention employs one or more internal enclosures within a housing, where the one or more internal enclosures can be substantially closed to minimize the transmission of electromagnetic signals, e.g. RF signals, to or from components within the gaming machine. Each internal enclosure is defined by an assembly of electrically conductive walls/structures.

Advantageously, the interior enclosure can minimize the transmission of higher frequency, smaller wavelength electromagnetic signals from higher powered computing devices. As such, the interior enclosure allows the gaming machine to employ more advanced gaming features that require greater computing power. The popularity of gaming machines can then be enhanced by faster and more powerful computer processors, which allow more sophisticated gameplay and/or audiovisual features. In contrast, the attempts to provide shielding in conventional gaming machines may find it more difficult to contain signals of smaller wavelengths.

According to one embodiment, a gaming terminal includes a housing defining an exterior of the gaming terminal. The gaming terminal includes one or more displays disposed along the housing. The one or more displays are adapted to display, in response to a wager, a wagering game. The gaming terminal also includes a substantially closed interior enclosure disposed within the housing. The interior enclosure includes walls formed from electrically conductive material. At least one pair of the walls is coupled by inserting a blade on an edge of the first of the pair of the walls into a groove on an adjacent edge of the second of the pair of the walls, where the blade and the groove are electrically conductive. The gaming terminal further includes one or more signal-emitting components disposed within the interior enclosure and emitting a level of electromagnetic signals. A transmission of electromagnetic signals from the interior enclosure is less than the level of electromagnetic signals emitted from the one or more signal-emitting components.

According to another embodiment, a gaming terminal includes a housing defining an exterior of the gaming terminal. The gaming terminal includes one or more displays disposed along the housing. The one or more displays are adapted to display, in response to a wager, a wagering game. The gaming terminal also includes a substantially closed interior enclosure disposed within the housing. The interior enclosure includes walls formed from electrically conductive material. The gaming terminal further includes one or more signal-emitting components disposed within the interior enclosure and emitting electromagnetic signals having frequencies between approximately 30 Mhz and approximately 1000 MHz. A transmission of the electromagnetic signals from the interior enclosure from the one or more signal-emitting components is less than approximately 47 dBµV/m for the frequencies between approximately 30 Mhz and approximately 1000 MHz.

In a further embodiment, a gaming terminal includes a housing defining an exterior of the gaming terminal. The gaming terminal includes one or more displays disposed along the housing. The one or more displays are adapted to display, in response to a wager, a wagering game. The gaming terminal also includes a substantially closed interior enclosure disposed within the housing. The interior enclosure includes walls formed from electrically conductive material. The walls include electrically conductive edges. The edges are directly coupled to cause the interior enclosure to be substantially closed. The gaming terminal further includes one or more signal-emitting components disposed within the interior enclosure and emitting a level of electromagnetic signals. A transmission of electromagnetic signals from the interior enclosure is less than the level of electromagnetic signals emitted from the one or more signal-emitting components.

Additional aspects of the invention will be apparent to those of ordinary skill in the art in view of the detailed description of various embodiments, which is made with reference to the drawings, a brief description of which is provided below.

Figure 1:
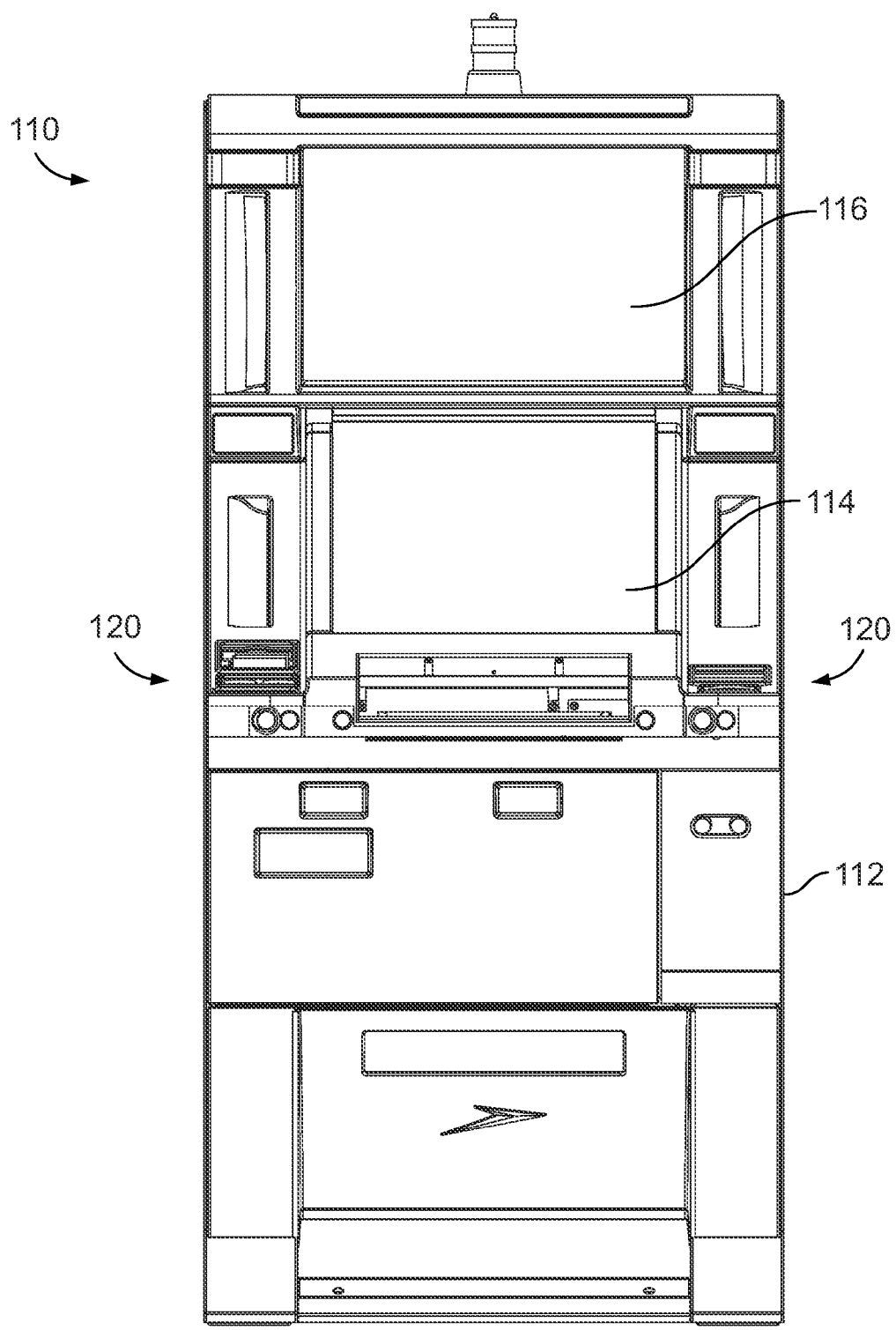
FIG. 1 illustrates an example free-standing gaming terminal according to aspects of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming terminal 110 according to aspects of the present invention is illustrated. The gaming terminal 110 includes a housing 112 that defines an exterior of the gaming terminal 110. The gaming terminal 110 includes one or more displays, e.g., a primary display 114 and a secondary display 116, disposed along the housing 112, e.g., along sides that are more visible to a player. The primary display 114 and the secondary display 116 may be, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 110. The primary display 114 and the secondary display 116 may display information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal 110. The gaming terminal 110 may also include one or more audio speakers to provide audio information, music, sound effects, or other sounds in combination with the information displayed by the primary display 114 and the secondary display 116. Additionally, the gaming terminal 110 includes a variety of input devices 120, which may include a bill validator, a coin acceptor, an information reader, one or more player-input devices, and/or one or more player-accessible ports.

The gaming terminal 110 shown in FIG. 1 may be an electronic gaming terminal configured to play a video casino game, such as slots, keno, poker, blackjack, roulette, craps, etc. It is understood, however, that aspects of the present invention may be implemented with other types of gaming terminals having varying structures and methods of operation. For example, in some aspects, the gaming terminal may include electromechanical features, such as mechanical slots.

Video images in the primary display area 114 and/or the secondary display area 116 may be rendered in two-dimensional (e.g., using Flash Macromedia™) or three-dimensional graphics (e.g., using Renderware™). In various aspects, the video images are played back (e.g., from a recording stored on the gaming terminal 110), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

Figure 2:
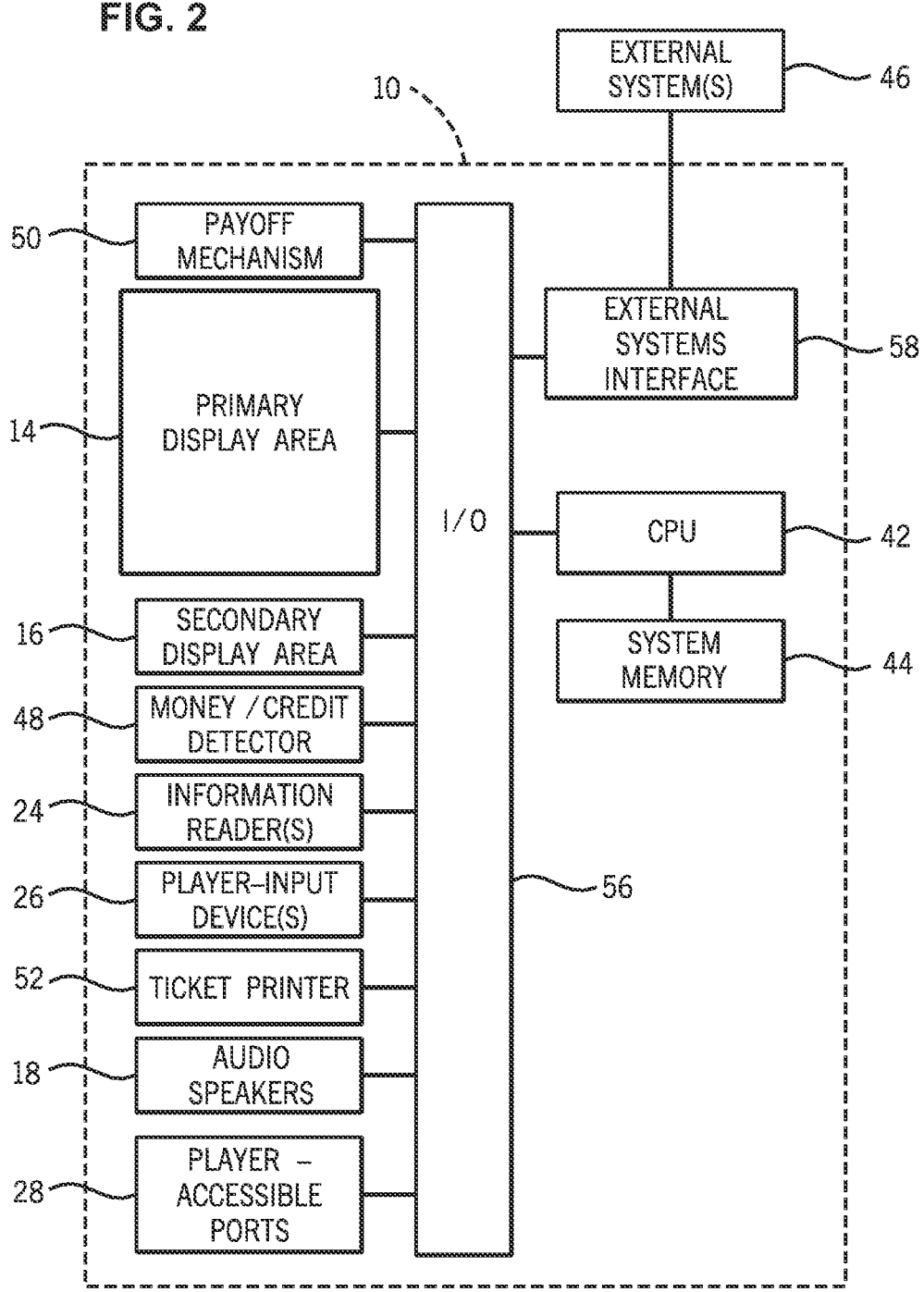
FIG. 2 illustrates a schematic view of a gaming system.

Referring to FIG. 2, the input devices 120 may include player-input or user-input device(s) 26, which include, by way of example, a plurality of buttons on a button panel, a mouse, a joy stick, a switch, a microphone, and/or a touch screen mounted over the primary display area 114 and/or the secondary display area 116 and having one or more soft touch keys. In still other aspects, the player-input devices 26 include technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

An information reader 24 (or information reader/writer), as illustrated in FIG. 2, may be located on the front of the housing 112 and includes, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 110 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Referring to FIG. 2, the various components of the gaming terminal 110 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, includes any combination of hardware, software, and/or firmware disposed in and/or disposed outside of the gaming terminal 110 that is configured to communicate with and/or control the transfer of data between the gaming terminal 110 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 110 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 110 and is connected to the remainder of the components of the gaming terminal 110, as appropriate, via a wired connection, such as I/O 56, or wireless connection. The money/credit detector 48 detects the input of valid funds into the gaming terminal 110 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 110, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 114, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 110 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 110 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 110 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 110 ("thick client" gaming terminal), the external systems 46 ("thin client" gaming terminal), or are distributed therebetween in any suitable manner ("intermediate client" gaming terminal).

Figure 3:
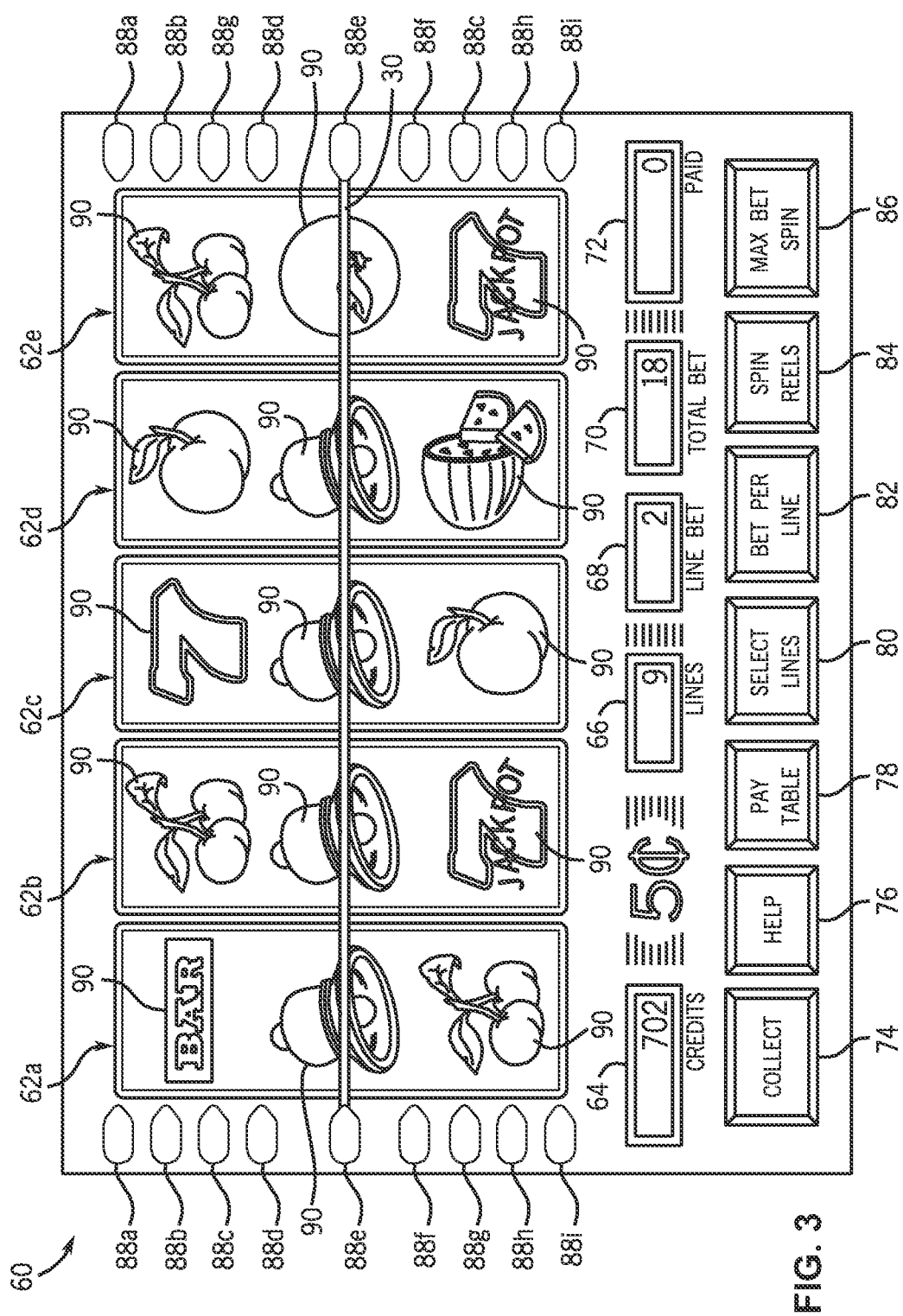
FIG. 3 illustrates an image of an exemplary basic-game screen of a wagering game displayed on a gaming terminal.

Referring now to FIG. 3, an image of a basic-game screen 60 adapted to be displayed on the primary display area 114 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 114 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 110 depicted in FIG. 1, following receipt of an input from the player to initiate the wagering game. The gaming terminal 110 then communicates the wagering game outcome to the player via one or more output devices (e.g., primary display 114) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to process the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 114 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 114 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62a-e; and a "max bet spin" button 86 for wagering a maximum number of credits and moving the reels 62a-e of the basic wagering game. While the gaming terminal 110 allows for these types of player inputs, the present invention does not require them and can be used on gaming terminals having more, less, or different player inputs.

As shown in the example of FIG. 3, paylines 30 extend from one of the payline indicators 88a-i on the left side of the basic-game screen 60 to a corresponding one of the payline indicators 88a-i on the right side of the screen 60. A plurality of symbols 90 is displayed on the plurality of reels 62a-e to indicate possible outcomes of the basic wagering game. A winning combination occurs when the displayed symbols 90 correspond to one of the winning symbol combinations listed in a pay table stored in the memory 44 of the terminal 110 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62a-e. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 110 comprise a greater or lesser number of reels in accordance with the present invention.

Figure 4:
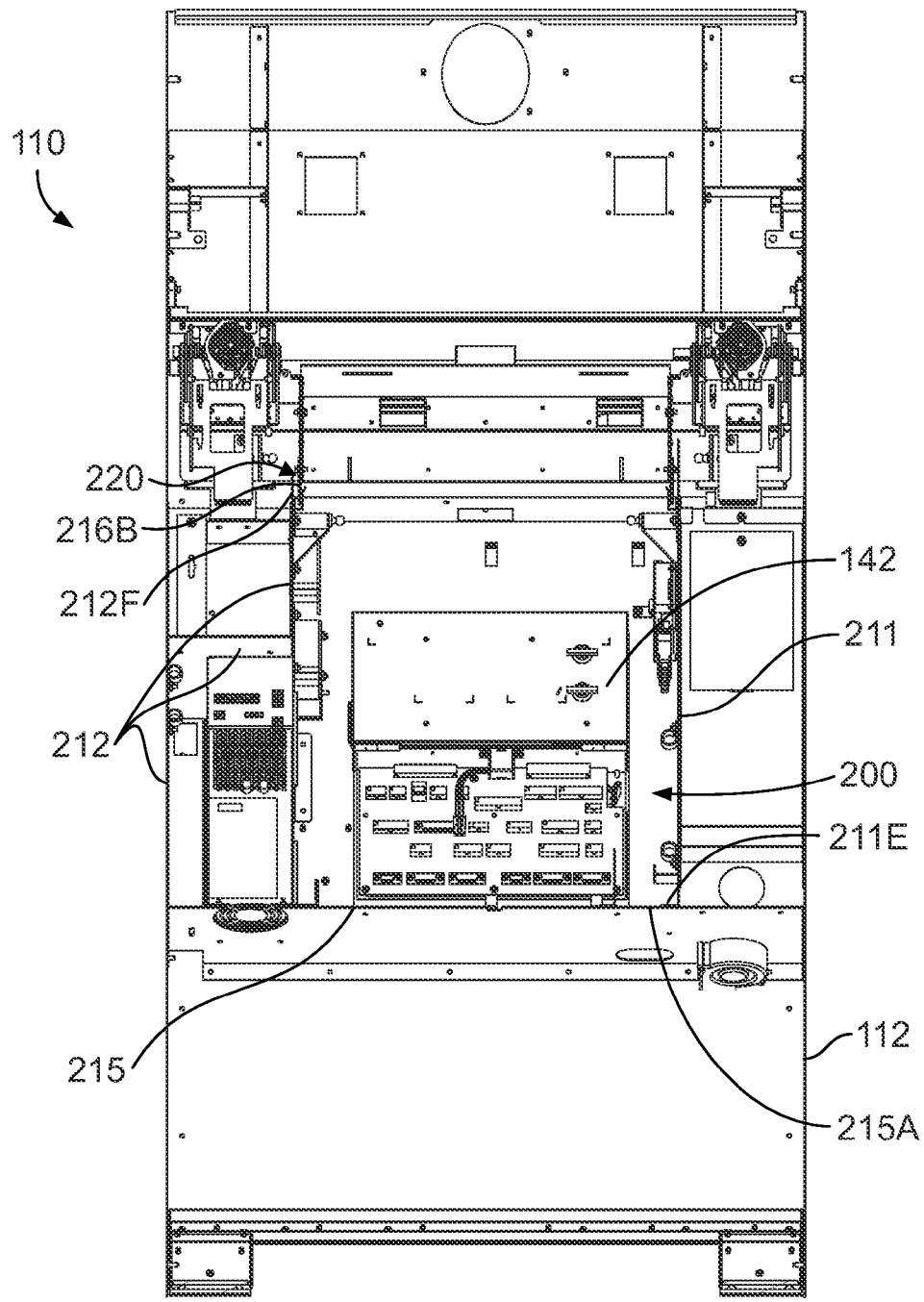
FIG. 4 illustrates a front cross-sectional view of the gaming terminal shown in FIG. 1, according to aspects of the present invention.
Figure 5:
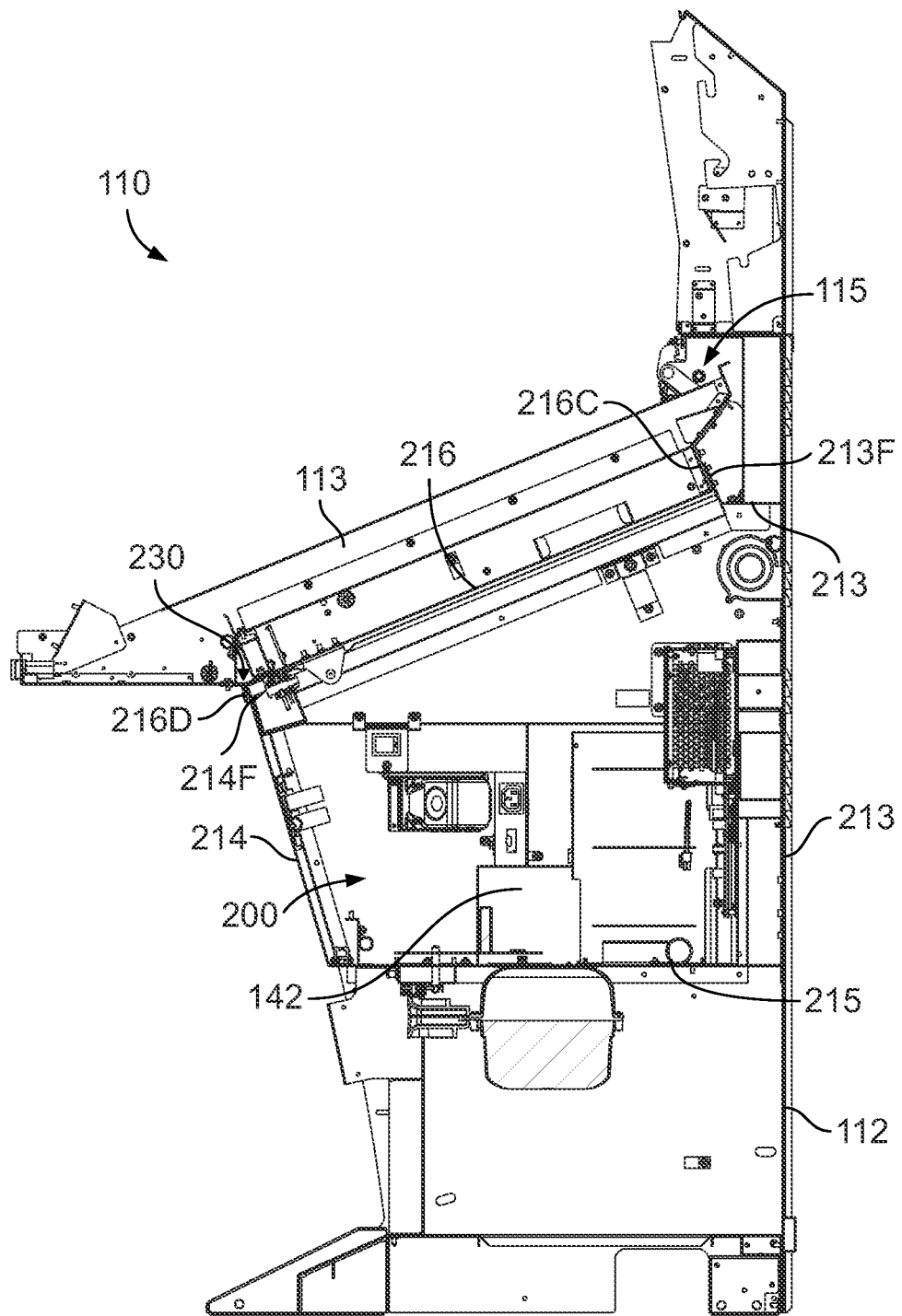
FIG. 5 illustrates a side cross-sectional view of the gaming terminal shown in FIG. 1, according to aspects of the present invention.

FIG. 4 illustrates a front cross-sectional view of the gaming terminal 110. FIG. 5 illustrates a side cross-sectional view of the gaming terminal 110. As FIGS. 4 and 5 illustrate, the gaming terminal 110 includes an interior enclosure 200 disposed within the housing 112. The interior enclosure 200 contains components 142, such as one or more processors, other computer components, electrical devices, network connections, wires, cables, etc., employed to operate aspects of the gaming terminal 110. The size of the interior enclosure 200 depends in part on the assembly of components 142 therein. In addition, the interior enclosure 200 is shaped in part to accommodate other structures within the housing 112 and to accommodate the shape of the housing 112. Although the embodiments described herein may describe a single interior enclosure, it is understood that other embodiments may employ more than one interior enclosure with the features described further below.

The combination of walls 211-216 shown in FIGS. 4 and 5 generally define the interior enclosure 200. In particular, FIG. 4 generally illustrates a right side wall 211, a left side wall 212, and a lower wall 215 for the interior enclosure 200, and FIG. 5 generally illustrates a rear wall 213, a front wall 214, the lower wall 215, and an upper wall 216 for the interior enclosure 200. Although the interior enclosure 200 may be described in terms of the walls 211-216, it is understood that the interior enclosure 200 is generally defined by an assembly of different structures that define outer boundaries for the interior enclosure 200.

Figure 6:
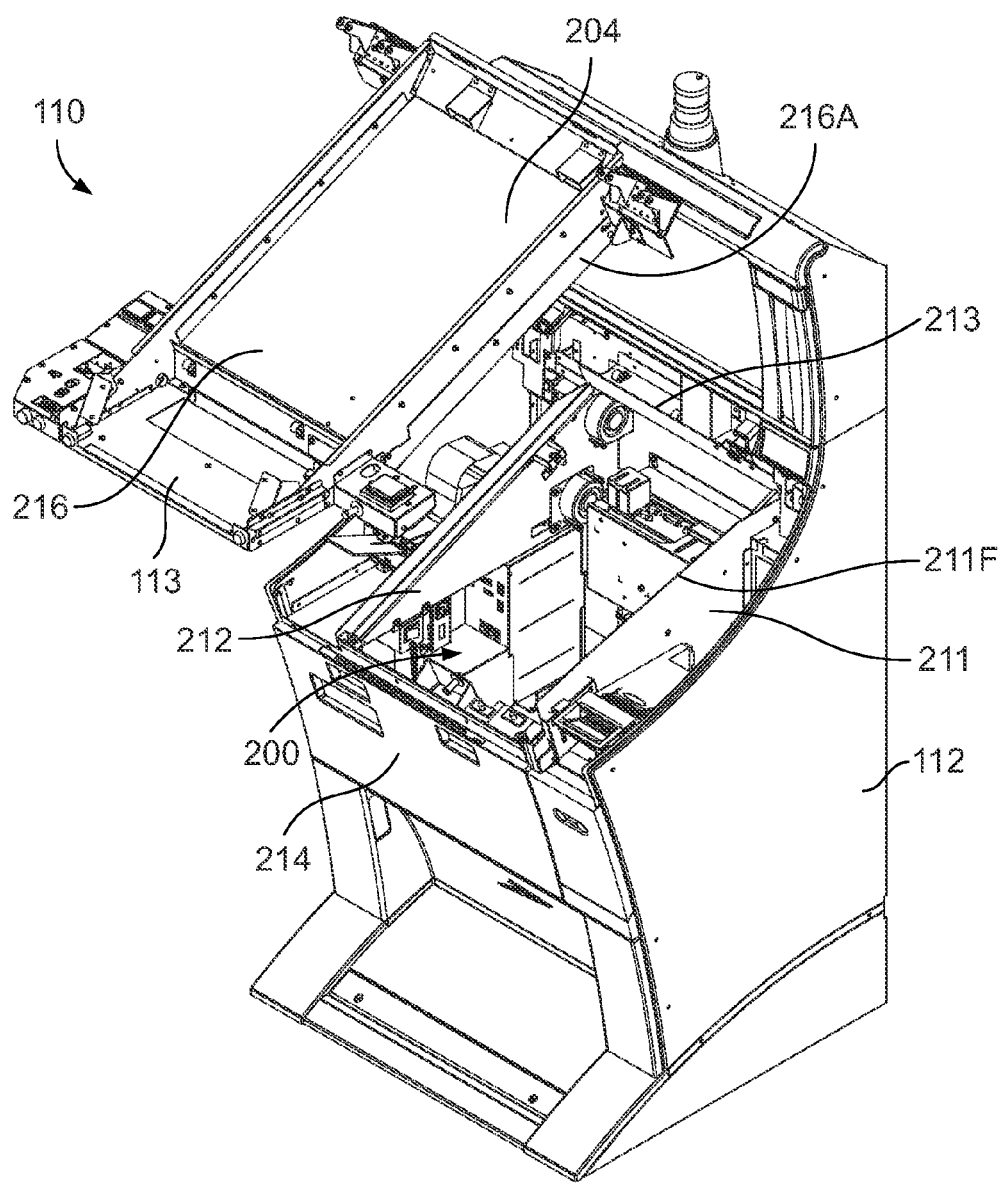
FIG. 6 illustrates an isometric view of the gaming terminal shown in FIG. 1, according to aspects of the present invention.

Each of the walls 211-216 may include any number of structures that are assembled to define a substantially continuous side of the interior enclosure 200. These structures correspond to different parts of the gaming terminal 110. For example, the right side wall 211 and the lower wall 215 are substantially defined by interior walls disposed within the housing 112. On the other hand, parts of the left side wall 212, the rear wall 213, and the front wall 214 are defined by exterior walls of the housing 112. Meanwhile, referring to FIG. 6, which illustrates an isometric view of the gaming terminal 110, the upper wall 216 is defined by a panel 204 of a door 113 to the housing 112. The panel 204 defines an area of the housing 112 for receiving the primary display 114, e.g., an LCD. As shown in FIG. 6, the door 113 pivots upwardly/downwardly at one edge and opens/closes access to the interior of the housing 112. Correspondingly, the upper wall 216 moves with the door 113 to open/close the interior enclosure 200.

In addition, the structures defining the walls 211-216 may be planar, non-planar, bent, curved, angled, or otherwise contoured to give a desired shape to the interior enclosure 200. For example, referring to FIG. 4, the left side wall 212 includes one or more sections that define a side that is bent at 90° angles in at least two places. Although the walls 211-216 as shown may appear to be defined by a plurality of substantially rectangular structures, the walls in other embodiments may include differently shaped structures.

The walls 211-216 are formed from electrically conductive materials, such as metal, metal-coated materials (e.g., metal-coated plastics), electrically conductive plastics, electrically conductive polymers, etc. For example, in an example embodiment, the walls 211-216 are formed from cold-rolled steel or zinc-plated steel. As described previously, each of the walls 211-216 may include any number of structures that are assembled to define a substantially continuous side of the interior enclosure 200. Correspondingly, it is contemplated that the structures defining each of the walls 211-216 are electrically conductive to allow electrical conduction across the walls 211-216.

Because the walls 211-216 are formed from electrically conductive material, the interior enclosure 200 effectively acts as a Faraday cage when the interior enclosure 200 is substantially closed. When the interior enclosure 200 is substantially closed, the walls 111-116 are coupled so that radio frequency (RF) signals emitted by the components 142 are prevented from escaping from the interior enclosure 200. The RF signals may include frequencies of approximately 30 MHz to approximately 1000 MHz. The configuration of the electrically conductive walls 211-216 causes the RF signals to dissipate instead of being transmitted out of the interior enclosure 200. Due to this dissipation, the transmission of RF signals out of the interior enclosure 200 is less than the level of RF signals emitted by the components 142.

Gaming machines typically comply with standards or regulations that control electromagnetic interference caused by electrical and electronic devices. Such standards or regulations are set, for example, by the Comité International Spécial des Perturbations Radioélectriques (CISPR) of the International Electrotechnical Commission (IEC) or the U.S. Federal Communications Commission (FCC). Many standards govern the level of interference caused by RF signals from devices such as the gaming terminals described herein. For example, applicable standards for radiated and conducted RF emissions may include FCC Rules and Regulations for Unintentional Radiators, Class B Digital Devices, Part 15, Subpart B, Sections 15.107a and 15.109a, or CISPR 22: Class B Information Technology Equipment—Radio Disturbance Characteristics (IEC/EN 55022 B).

Advantageously, the gaming terminal 110 employs the shielding provided by the interior enclosure 200 to comply with standards governing the emission of RF signals. In an example embodiment, the gaming terminal 200 may be configured to comply with CISPR standard IEC/EN 55022 B. Thus, according to the standard, the gaming terminal 110 has RF emissions at or below approximately 40 dBµV/m when the electronic components 142 in the gaming terminal 110 generate RF signals ranging from approximately 30 MHz to approximately 230 MHz. Meanwhile, when the RF signals range from approximately 231 MHz to approximately 1000 MHz, the RF signals from the gaming terminal 200 are emitted at or below 47 dBµV/m. Although the interior enclosure 200 may contain RF signals from the components 142 according to such standards, it is understood that the interior enclosure 200 may provide shielding for electromagnetic signals of other frequencies.

In addition to containing electromagnetic signals from the components 142, the interior enclosure 200 also prevents external electromagnetic signals from interfering with the components 142 within the interior enclosure 200. For example, the components 142 are protected from electrostatic discharge or other radiation that occurs outside the interior enclosure 200. Conventional gaming machines typically employ shielded line cords to prevent unwanted signals from traveling along the cords to electrical/electronic components. The interior enclosure 200, however, eliminates or minimizes the need for line cord shielding.

The walls 211-216 can be assembled according to a variety of techniques to close the interior enclosure 200 and provide shielding around the components 142. Any adjacent pair of the walls 211-215 may be coupled at their edges by welding, riveting, bolting, screwing, clamping, snap-fitting, or applying any other technique that brings the edges sufficiently together to minimize the transmission of RF signals from the interior enclosure 200. The edges of the walls 211-215 may be shaped, dimensioned, or otherwise configured to facilitate the coupling of the walls 211-215. For example, as shown in FIG. 4, a lower edge 211E of the right side wall 211 is angled upwardly, e.g., at approximately 90°, to align with an adjacent right side edge 215A of the lower wall 215 and facilitate coupling of the walls 211 and 215.

As discussed previously, the upper wall 216 defined by the panel 204 moves with the door 113 to open/close the interior enclosure 200. As such, the upper wall 216 is coupled in a manner that allows opening/closing movement. However, the upper wall 216 minimizes the transmission of RF signals into or out of the interior enclosure 200 when the upper wall 216 is closed against the right side wall 211, the left side wall 212, the rear wall 213, and the front wall 214.

Figure 7:
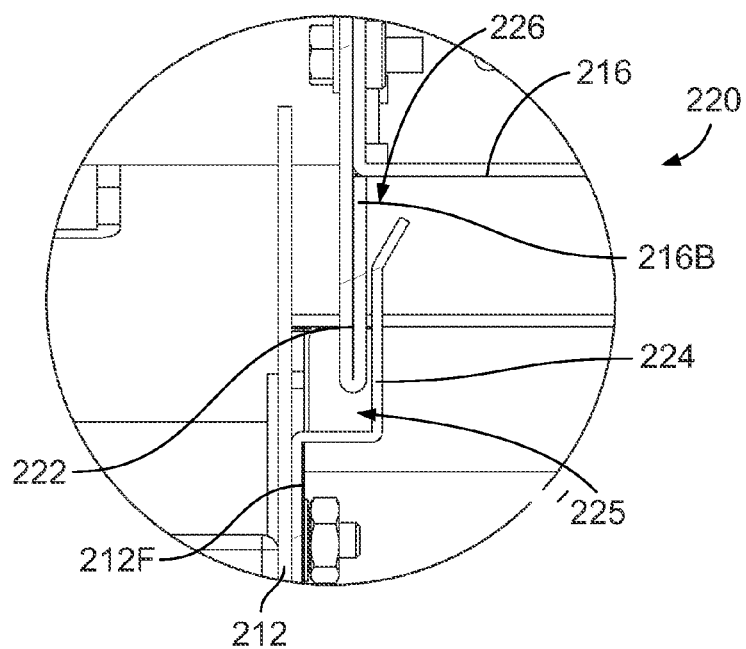
FIG. 7 illustrates an example coupling between walls of an interior enclosure in the gaming terminal shown in FIG. 1, according to aspects of the present invention.

As shown in FIGS. 4 and 5, the upper wall 216 includes a right side edge 216A that engages the upper edge 211F of the right side wall 211. Correspondingly, the upper wall 216 includes a left side edge 216B that engages the upper edge 212F of the left side wall 212. FIG. 7 illustrates a coupling 220 between the left side edge 216B of the upper wall 116 and the upper edge 212F of the left side wall 212. A similar coupling may be employed between the right side edge 216A of the upper wall 116 and the upper edge 211F of the right side wall 211. As shown in FIG. 7, the left side edge 216B of the upper wall 216 includes a blade 222 that is angled downwardly, e.g., at approximately 90°, from the rest of the top surface 216 to align with, and engage, the upper edge 212F of the left side wall 212. As shown in FIG. 7, the blade 222 is a separate electrically conductive structure that is coupled, e.g., bolted, to the rest of the upper wall 216. It is understood, however, that the blade 222 may be more integrally formed as a part of the upper wall 216.

Meanwhile, the upper edge 212F of the left side wall 212 includes an electrically conductive bracket 224 that is shaped to define a groove 225 on an inner side of the left side wall 212. As shown in FIG. 7, the bracket 224 is a separate electrically conductive structure that is coupled, e.g., bolted, to the rest of the left side wall 212. It is understood, however, that the bracket 224 may be more integrally formed as a part of the left side wall 212.

As the door 113 and the upper wall 216 moves downwardly into the closed position, the blade 222 moves downwardly into the groove 225. When the blade 222 is received into the groove 225, their engagement helps maintain the door 113 and the upper wall 216 in a stable closed position. When the door 113 is closed, the blade 222 forms an overlapping seal with the groove 225. The overlapping seal keeps RF signals from passing between the upper wall 216 and the left side wall 212. In an example embodiment, the blade 222 and the groove 225 form an overlapping seal of approximately 0.75 inches. In some cases, the blade 222 and bracket 224 are in contact so that there is substantially no gap therebetween. In other cases, if a small gap exists between the blade 222 and the groove 225, any RF signals traveling through the gap dissipate before they are transmitted into or out of the interior enclosure 200. In particular, the RF signals must travel through a path defined by the blade 222 and the groove 225, and the path is long enough to allow the RF signals to dissipate. In an example embodiments, the gap between the blade 222 and the bracket 224 ranges from approximately 0 to approximately 0.25 inches.

Figure 8:
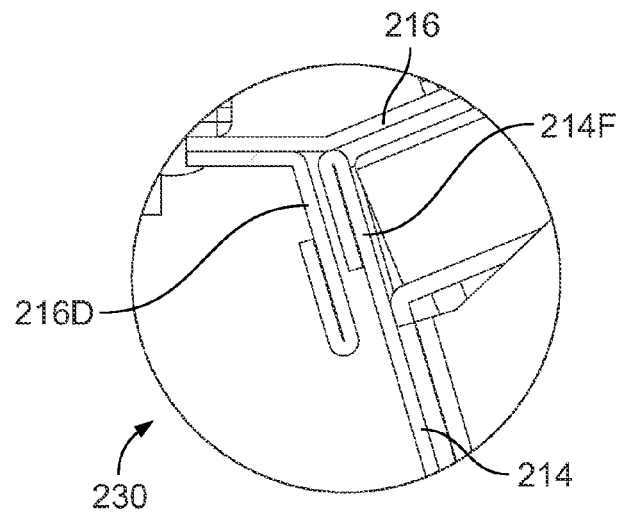
FIG. 8 illustrates another example coupling between walls of an interior enclosure in the gaming terminal shown in FIG. 1, according to aspects of the present invention.

As shown in FIG. 5, the upper wall 216 includes a front edge 216D that engages the upper edge 214F of the front wall 214. FIG. 8 illustrates a coupling 230 between the front edge 216D of the upper wall 216 and the upper edge 214F of the front wall 214. As shown in FIG. 8, the front edge 216D is angled downwardly from the rest of the upper wall 216 to align with, and engage, the upper edge 214F of the front wall 214. The front edge 216D may be a separate electrically conductive structure that is coupled to the rest of the upper wall 216 or it may be more integrally formed as a part of the upper wall 216. The upper edge 214F of the front wall 214 extends along the general plane defined by the front wall 214 and is configured to engage the front edge 216D of the upper wall 216.

As the door 113 and the upper wall 216 moves downwardly into the closed position, the front edge 216D of the upper wall 216 slides down against the upper edge 214F of the front wall 214 to form an overlapping seal. The overlapping seal keeps RF signals from passing between the upper wall 216 and the front wall 214. In an example embodiment, the front edge 216D of the upper wall 216 and the upper edge 214F of the front wall 214 form an overlapping seal of approximately 0.75 inches. In some cases, the front edge 216D of the upper wall 216 and the upper edge 214F of the front wall 214 are in contact so that there is substantially no gap therebetween. In other cases, if a small gap exists between the front edge 216D of the upper wall 216 and the upper edge 214F of the front wall 214, any RF signals traveling through the gap dissipate before they pass into or out of the interior enclosure 200. In particular, the RF signals must travel through a path defined by the front edge 216D of the upper wall 216 and the upper edge 214F of the front wall 214, and the path is long enough to allow the RF signals to dissipate. In an example embodiment, the gap between front edge 216D of the upper wall 216 and the upper edge 214F of the front wall 214 ranges from approximately 0 to approximately 0.25 inches.

As also shown in FIG. 5, the upper wall 216 includes a rear edge 216C that engages the upper edge 213F of the rear wall 213. As the door 113 and the upper wall 216 pivot downwardly into the closed position about the rear hinge 115, the rear edge 216C of the upper wall 216 pivots correspondingly into position against the upper edge 213F of the rear wall 213 to form an overlapping seal. The overlapping seal keeps RF signals from passing between the upper wall 216 and the rear wall 213. In an example embodiment, the rear edge 216C of the upper wall 216 and the upper edge 213F of the rear wall 213 form an overlapping seal of approximately 1.25 inches. In some cases, the rear edge 216C of the upper wall 216 and the upper edge 213F of the rear wall 213 are in contact so that there is substantially no gap therebetween. In other cases, if a small gap exists between the rear edge 216C of the upper wall 216 and the upper edge 213F of the rear wall 213, any RF signals traveling through the gap dissipate before they are transmitted into or out of the interior enclosure 200. In particular, the RF signals must travel through a path defined by the rear edge 216C of the upper wall 216 and the upper edge 213F of the rear wall 213, and the path is long enough to allow the RF signals to dissipate. In example embodiments, the gap between the rear edge 216C of the upper wall 216 and the upper edge 213F of the rear wall 213 from approximately 0 to approximately 0.125 inches.

The upper wall 216 engages the other walls 211-214 in a manner that facilitates movement of the door 113 and the upper wall 216 into a closed position. In other words, the couplings described previously minimize any resistance an operator may encounter as the upper surface 216 engages the other walls 211-215. The blades along the right side edge 216A and the left side edge 216B of the upper wall 216 slides easily into respective grooves at the upper edge 211F of the right side wall 211 and the upper edge 212F of the left side wall 212, because the corresponding edges remain aligned during the movement of the door 113. As illustrated in the example coupling 230 of FIG. 7, the bracket 224 may be angled at the top of the groove 225 to create a larger area 226 to receive the blade 222 and guide the blade 222 into the groove 225. Meanwhile, as shown in FIG. 8, the front edge 216D of the upper wall 216 and the upper edge 214F of the front wall 214 are rounded to allow the front edge 216D of the upper wall 216 to slide over upper edge 214F of the front wall 214. Meanwhile, the rear edge 216C of the upper wall 216 pivots easily into position against the upper edge 213F of the rear wall 213.

The techniques by which the upper wall 216 is coupled to the other walls 211-214 are provided only as examples. In general, any technique or combination of techniques may be employed to form overlapping seals between the upper wall 216 and the other walls 211-214.

As described previously, the interior enclosure 200 contains components 142, such as one or more processors, other computer components, electrical devices, network connections, electrical cabling, etc., employed to operate aspects of the gaming terminal 110. The components 142 may be coupled, e.g., via wires, to external components outside the interior enclosure 200. For example, the components 142 may be coupled by wires to the primary display 114 and the secondary display 116 to control what is displayed by the gaming terminal 110. In addition, the components 142 may receive electrical power, via power cables, from a source, e.g., a conventional electrical outlet, outside the interior enclosure. To allow cables, wires, lines, etc. to pass through the walls of the interior enclosure 200 while preserving the shielding provided by the interior enclosure 200, ferrite blocks may be employed in the walls to define a passageway for the cables, wires, lines, etc. In some embodiments, the number of such passageways are minimized to reduce the possibility of signal leaks.

Figure 9:
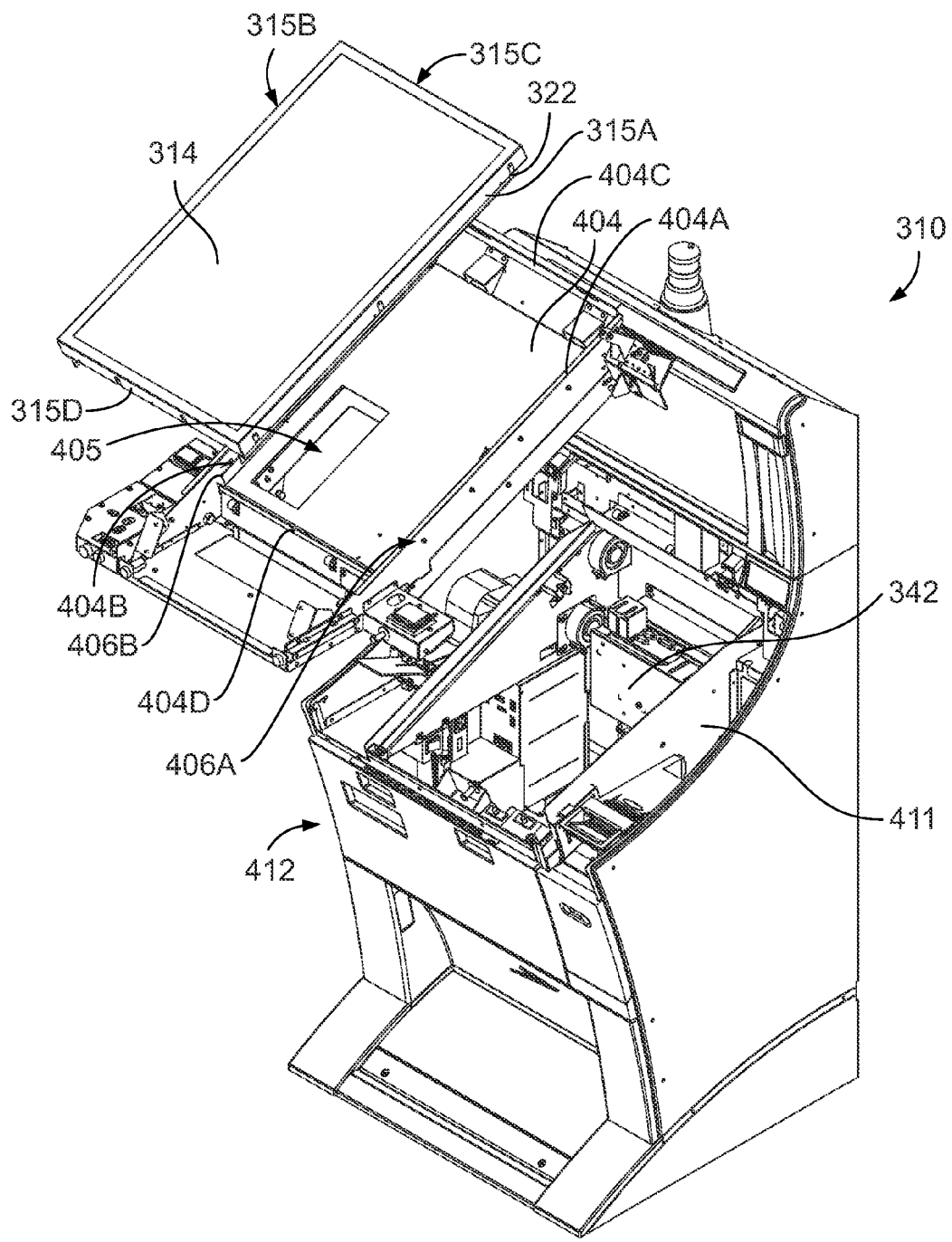
FIG. 9 illustrates an isometric view of another example gaming terminal according to aspects of the present invention.
Figure 10:
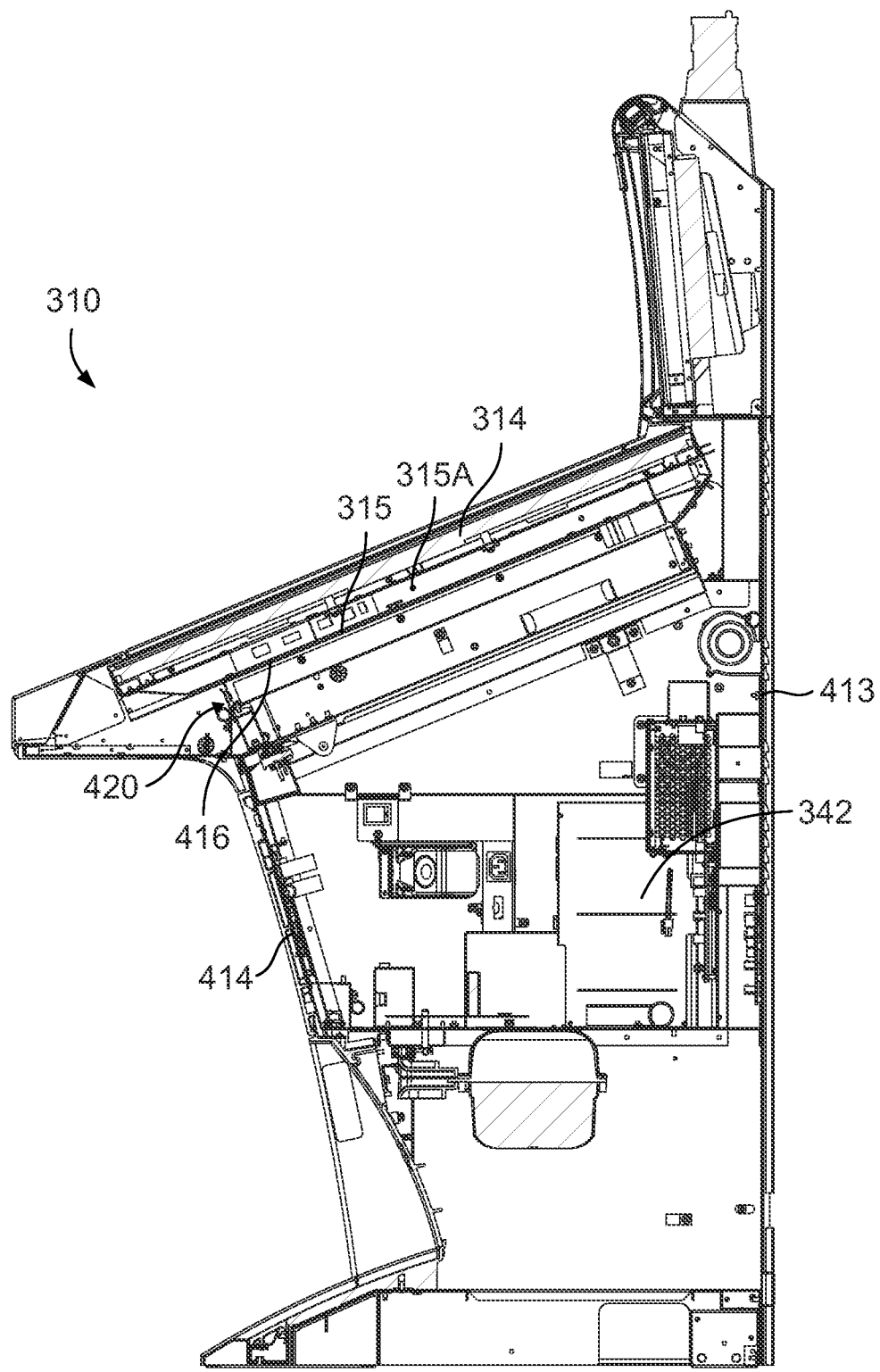
FIG. 10 illustrates a side cross-sectional view of the gaming terminal shown in FIG. 9, according to aspects of the present invention.

As described previously, the primary display 114 is positioned on the panel 204 of the door 113, which defines the upper wall 216. FIGS. 9 and 10 illustrate an alternative embodiment, in which a gaming terminal 310 provides an opening 405 in a panel 404 of a door 313 to allow connections between components 342 in an interior enclosure 400 and a display 314. The interior enclosure 400 is similar in most respects to the interior enclosure 300 described previously, except the upper wall 416 of the interior enclosure 400 is defined at least partially by a bottom 315 of the display 314 on the other side of the opening 305. Like the other structures defining the walls 411-416 of the interior enclosure 400, the back 315 of the display 314 is formed from electrically conductive material.

Because the back 315 of the display 314 defines the upper wall 416 of the interior enclosure 400, the display 314 is coupled to the rest of the interior enclosure 400 in a manner that minimizes the transmission of RF signals into and out of the interior enclosure 400. As shown in FIGS. 9 and 10, the couplings between the panel 404 of the door 213 and the other walls 411-414 of the interior enclosure 400 is similar to the couplings between the panel 204, i.e., the upper wall 216, and the other walls 211-214 described previously. However, in this embodiment, the display 314 is also coupled to the panel 404 so that the back 315 of the display 314 can act as the upper wall 416 of the interior enclosure 400.

As shown in FIG. 9, a right side edge 315A of the back 315 of the display 314 engages the right side edge 404A of the panel 404. Correspondingly, a left side edge 315B of the bottom panel includes engages the left side edge 404B of the panel 404. The right side edge 315A includes an electrically conductive blade 322 that is angled downwardly, e.g., at approximately 90°, from the rest of the bottom panel 315 to align with, and engage, an electrically conductive groove 406A at the right side edge 404A of the panel 404. The blade 322 and the groove 406A form an overlapping seal that keeps RF signals from passing between the display 314 and the panel 404, which is securely coupled to the walls 411-414. In an example embodiment, the blade 322 and the groove 406A form an overlapping seal of approximately 1.0 inches. In some cases, the blade 322 and groove 406A are in contact so that there is substantially no gap therebetween. In other cases, if a small gap exists between the blade 322 and the groove 406A, any RF signals traveling through the gap dissipate before they are transmitted into or out of the interior enclosure 400. In particular, the RF signals must travel through a path defined by the blade 322 and the groove 406A and the path is long enough to allow the RF signals to dissipate. In an example embodiments, the gap between the blade 322 and the groove 406A ranges from approximately 0 to approximately 0.125 inches.

Figure 11:
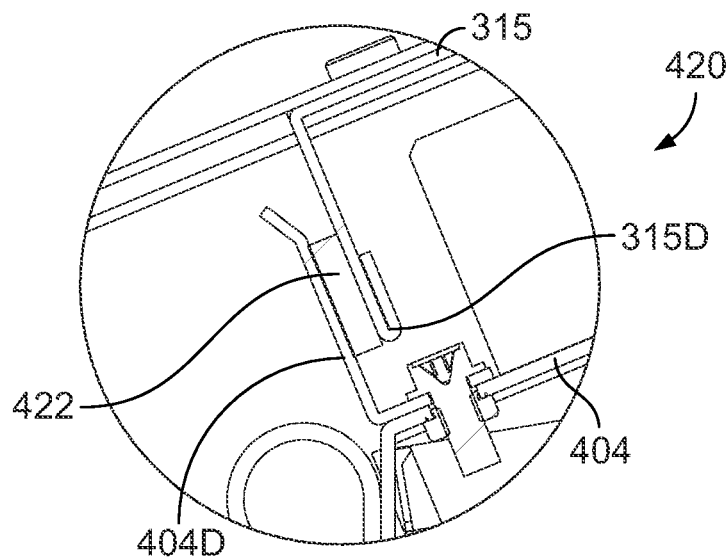
FIG. 11 illustrates an example coupling between walls of an interior enclosure in the gaming terminal shown in FIG. 9, according to aspects of the present invention.

The front edge 315D of the display 314 is angled downwardly from the rest of the back 315 to align with the front edge 404D of the panel 404 according to a coupling 420 shown in FIG. 11. Correspondingly, the front edge 404D of the panel 404 is angled upwardly to align with the front edge 315D of the display 314. The front edge 315D of the display 314 may be a separate electrically conductive structure that is coupled to the rest of the back 315, or it may be more integrally formed as a part of the back 315. Likewise, the front edge 404D may be a separate electrically conductive structure that is coupled to the rest of the panel 404 as shown in FIG. 11, or it may be more integrally formed as a part of the panel 404.

In some embodiments, the front edge 315D of the display 314 slides into direct engagement with the front edge of 404D of the panel 404 to form an overlapping seal. The overlapping seal keeps RF signals from passing between the front edge 315D of the display 314 and the front edge of 404D of the panel 404. In some cases, the front edge 315D of the display 314 and the rear edge 404D of the panel 404 are in contact so that there is substantially no gap therebetween. In other cases, a small gap may exist between the front edge 315D of the display 314 and the front edge 404D of the panel 404, but any RF signals traveling through the gap dissipate before they are transmitted from the interior enclosure 200. Alternatively, as FIG. 11 illustrates, an electrically conductive gasket 422 is optionally disposed in a gap between the front edge 315D and the front edge 404D. The embodiment of FIG. 11 demonstrates that in some instances electrically conductive gaskets may be employed to close any gaps between sections of the walls of the interior enclosure, but as described herein, aspects according to the present invention minimize the need to use gaskets to fill a gap.

Figure 12:
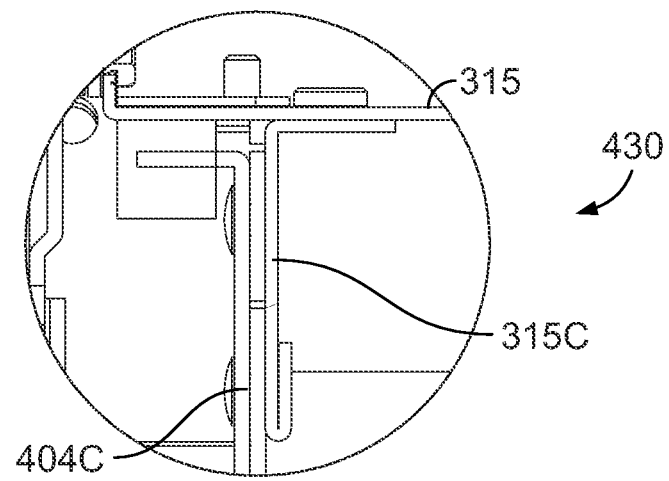
FIG. 12 illustrates another example coupling between walls of an interior enclosure in the gaming terminal shown in FIG. 9, according to aspects of the present invention.

The rear edge 315C of the display 314 is angled downwardly from the rest of the back 315 to align with the rear edge 404C of the panel 404 according to a coupling 430 shown in FIG. 12. Correspondingly, the rear edge 404C of the panel 404 is angled upwardly to align with the rear edge 315C of the display 314. The rear edge 315C of the display 314 may be a separate electrically conductive structure that is coupled to the rest of the back 315 as shown in FIG. 12, or it may be more integrally formed as a part of the back 315. Likewise, the rear edge 404C may be a separate electrically conductive structure that is coupled to the rest of the panel 404, or it may be more integrally formed as a part of the panel 404. The rear edge 315C of the display 314 slides into direct engagement with the rear edge of 404C of the panel 404 to form an overlapping seal. The overlapping seal keeps RF signals from passing between the rear edge 315C of the display 314 and the rear edge of 404C of the panel 404. In some cases, the rear edge 315C of the display 314 and the rear edge of 404C of the panel 404 are in contact so that there is substantially no gap therebetween. In other cases, a small gap may exist between the rear edge 315C of the display 314 and the rear edge 404C of the panel 404, but any RF signals traveling through the gap dissipate before they are transmitted into or out of the interior enclosure 200.

In summary, a gaming machine according to aspects of the present invention employs one or more internal enclosures within a housing, where the one or more internal enclosures can be substantially closed to minimize the transmission of electromagnetic signals, e.g. RF signals, to or from components within the gaming machine. Each internal enclosure is defined by an assembly of electrically conductive walls/structures.

Advantageously, the interior enclosure can minimize the transmission of higher frequency, smaller wavelength electromagnetic signals from higher powered computing devices. As such, the interior enclosure allows the gaming machine to employ more advanced gaming features that require greater computing power. The popularity of gaming machines can then be enhanced by faster and more powerful computer processors, which allow more sophisticated gameplay and/or audiovisual features. In contrast, the attempts to provide shielding in conventional gaming machines may find it more difficult to contain signals of smaller wavelengths.

Advantageously, using an interior enclosure for shielding simplifies design, testing, and manufacturing of gaming machines and reduces the costs associated with these activities. For example, the interior enclosure facilitates the configuration and assembly of the gaming terminal. The emission of RF signals from devices, such as gaming terminals, may depend on how signal-emitting components are assembled together within the device. For example, the positioning or organization of signal-carrying cables within a device may affect the overall emission characteristics of the device. According to aspects of the present invention, the manner in which signal-emitting components are assembled together within the gaming machine is less significant when the many of the signal-emitting components are assembled within the shielding of the interior enclosure. Indeed, changes or additions to the assembly of the signal-emitting components can be more easily made without significant impact to the overall emission characteristics of the gaming machine when the changes or additions are made within the interior enclosure. In some embodiments, the interior enclosure provides an allowance of 10 dBμV/m for such changes or additions. Moreover, by minimizing the number of signal-emitting components outside the interior enclosure, testing of the gaming machine is facilitated, as any sources of interference are more easily identified.

Conventional gaming terminals rely on the exterior housing to contain the emission of RF signals. As a result, the conventional gaming terminals must often use electromagnetic interference (EMI) gaskets to close gaps along the housings. The effectiveness of EMI gaskets, however, depends on the proper positioning of the EMI gaskets and on the amount of pressure applied to the EMI gaskets in the gaps. The EMI gaskets are often difficult to implement and cannot be used to seal all gaps. In addition, over time, the EMI gaskets may become dislodged from their proper positioning and may become damaged or suffer from wear. As such, the use of EMI gaskets is often unreliable and the devices using them are susceptible to signal leaks. According to aspects of the present invention, the reliance on EMI gaskets can be minimized. For example, the walls 211-216 of the interior enclosure 200 are not assembled with EMI gaskets. Instead, the walls 211-216 are coupled more directly at their edges.

Furthermore, to contain the emission of RF signals, conventional gaming devices also often use a complex and almost ad-hoc assembly of metal plates along the housing. According to aspects of the present invention, the gaming terminal employs a simpler assembly of walls to form the interior enclosure. In addition, because it is not necessary to employ metal plates along the housing, aspects of the housing may be formed from non-metal materials, such as plastic, which may provide aesthetic, manufacturing, and/or cost benefits.

Each of these embodiments and obvious variations thereof is contemplated as falling within the spirit and scope of the claimed invention, which is set forth in the following claims.

What is claimed is:

1. A gaming terminal configured to reduce electromagnetic emissions from the gaming terminal, the gaming terminal comprising:
   one or more display devices;
   one or more processors;
   one or more memory devices storing instructions that, when executed by at least one of the one or more processors, cause the gaming terminal to conduct a wagering game that includes rendering and displaying high-definition video game images;
   an exterior housing; and
   an electronics enclosure disposed within the exterior housing, the electronics enclosure having one or more video-rendering processors and one or more line cords carrying video signals to the one or more display devices installed within the electronics enclosure, the electronics enclosure comprising:
      one or more electrically coupled, electrically conductive, fixed walls;
      an electrically conductive opening wall, the opening wall electrically coupled to at least one of the one or more fixed walls, the opening wall having a hinged connection with a hinge axis along a first hinge edge and being pivotally connected to a second hinge edge of at least one of the one or more fixed walls, wherein the opening wall has a first opening therethrough to an interior of the electronics enclosure that enables the one or more line cords to exit the electronics enclosure, the electronics enclosure being further defined by a bottom surface of an electronic device mounted over the first opening, the bottom surface of the electronic device being electrically conductive and directly contacting the opening wall, the opening wall having an open position that augments access to the interior of the electronics enclosure and a closed position that reduces access to the interior;
      a blade non-rotationally fixed to one of the opening wall and an adjacent fixed wall of the one or more fixed walls;
      a mating channel non-rotationally fixed to the other of the opening wall and the adjacent fixed wall, the mating channel being open in a direction facing the blade such that the blade enters the mating channel as the opening wall pivots around the hinge axis to the closed position;
      wherein, with the opening wall in the closed position, electronic signals emitted, during play of the wagering game by the video-rendering processors and the associated line cords, into a gap between an opening wall edge and an edge of the adjacent fixed wall are attenuated by the blade extending into the mating channel opening; and
      wherein, with the opening wall in the open position, the emitted electronic signals are unattenuated due to the gap being unblocked by the blade being wholly withdrawn from inside the mating channel.

2. The gaming terminal of claim 1, wherein the blade and the mating channel are formed from electrically conductive material and wherein, when the blade is inserted into the mating channel, another gap remains between the blade and the mating channel.

3. The gaming terminal of claim 1, wherein the blade is fixed to the opening wall and the mating channel is fixed to one or more of the one or more fixed walls.

4. The gaming terminal of claim 1, wherein the mating channel opening length extends away from the hinge axis of the hinged connection at a right angle.

5. The gaming terminal of claim 1, wherein there is a difference between a cross-sectional mating channel opening width and a cross-sectional thickness of the blade ranges from ⅛" to ⅜".

6. The gaming terminal of claim 1, wherein there is a difference between a cross-sectional mating channel opening width and a cross-sectional thickness of the blade ranges from 5/16" to 3/16".

7. The gaming terminal of claim 1, wherein the blade extends into the mating channel to a depth ranging from ½" to 1".

8. The gaming terminal of claim 1, wherein the blade extends into the mating channel to a depth ranging from ⅝" to ⅞".

9. The gaming terminal of claim 1, wherein, in the closed position and along a length of the blade that extends into the mating channel, the mating channel contacts the blade on either an inward or an outward side of the blade at discrete locations along the blade and not at all on a corresponding outward or a corresponding inward side at each of the discrete locations.

10. The gaming terminal of claim 1, wherein, in the closed position, the mating channel does not contact the blade.

11. The gaming terminal of claim 1, wherein, while pivoting around the hinge axis from the open position to the closed position, the blade first enters the mating channel proximal the first hinge edge and progressively enters the mating channel at increasing distance from the first hinge edge.

12. The gaming terminal of claim 1, wherein the one or more video-rendering processors and the one or more line cords emit signals having frequencies ranging from 25 Mhz and 1250 Mhz.

13. A method of reducing electromagnetic emissions from an electronics enclosure of a wagering game system, the electronic enclosure defined by one or more electrically coupled, electrically conductive, fixed walls and an electrically conductive opening wall, the opening wall including a hinged connection with a hinge axis along a first hinge edge, and having an open position that augments access to an interior of the electronics enclosure and a closed position that reduces access to the interior, the opening wall further having a first opening therethrough to the interior of the electronics enclosure, the electronics enclosure being further defined by a bottom surface of an electronic device mounted over the first opening, the bottom surface of the electronic device being electrically conducting and directly contacting the opening wall, the method comprising:
   installing, in the interior of the electronic enclosure, one or more video-rendering processors and one or more line cords carrying high-definition video signals from the one or more video-rendering processors to one or more display devices, the one or more line cords exiting the electronics enclosure via the first opening;
   electrically coupling the opening wall to at least one of the one or more fixed walls;
   constructing a blade that is non-rotationally fixed to one of the opening wall and an adjacent fixed wall of the one or more fixed walls;
   constructing a mating channel that is non-rotationally fixed to the other one of the opening wall and the adjacent fixed wall, the mating channel being open in a direction facing the blade such that the blade enters the mating channel as the opening wall pivots around the hinge axis to the closed position at which the blade does not contact the mating channel;

pivotally connecting the hinged connection of the opening wall to a second hinge edge of at least one of the one or more fixed walls such that the opening wall pivots between the open position and the closed position, wherein, with the opening wall in the closed position, a gap between an opening wall edge and an adjacent fixed wall edge is blocked by the blade extending into a cross-sectional mating channel opening and, with the opening wall in the open position, the gap is unblocked by the blade being wholly withdrawn from inside the mating channel; and maintaining the opening wall in the closed position while conducting a wagering game that includes displaying high-definition video game images rendered by the one or more video-rendering processors installed in the electronic enclosure.

14. The method of claim 13, wherein the blade and the mating channel are formed from electrically conductive material.

15. The method of claim 13, wherein, while pivoting around the hinge axis from the open position to the closed position, the blade first enters the mating channel proximal the first hinge edge and progressively enters the mating channel at increasing distance from the first hinge edge.

* * * * *